UNITED STATES PATENT OFFICE.

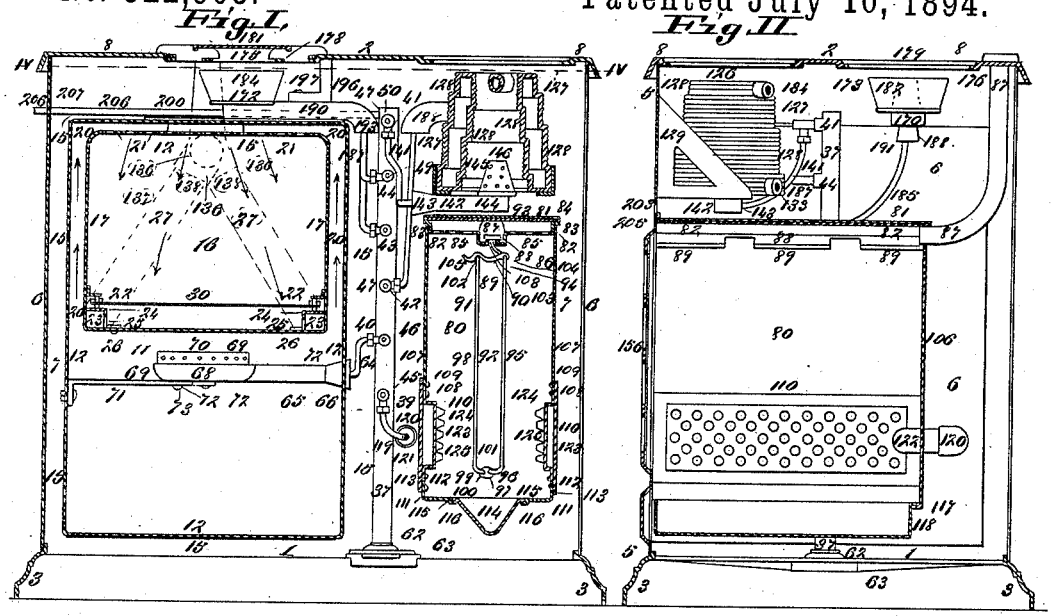

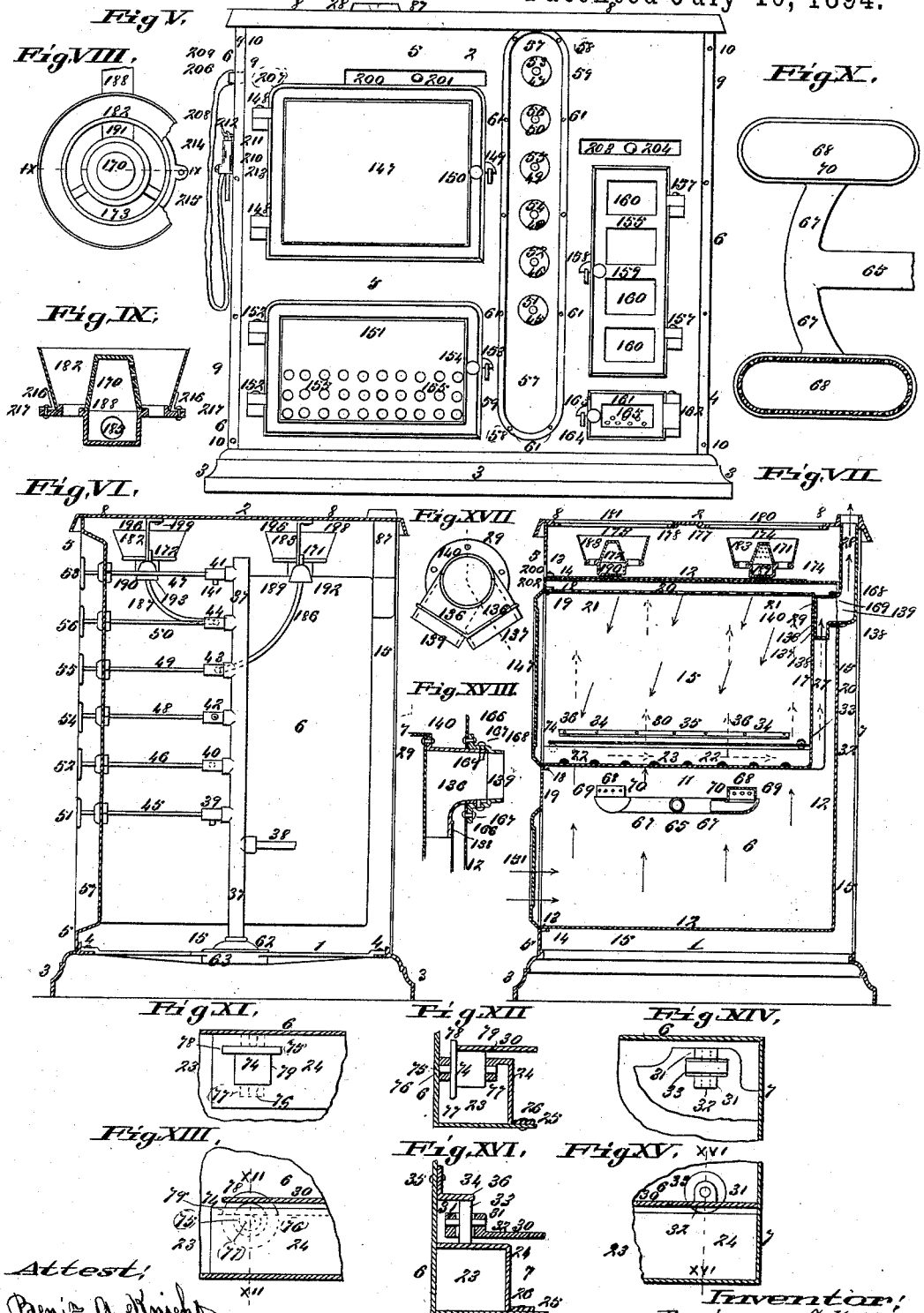

BENJAMIN S. KOLL, OF ST. LOUIS, MISSOURI, ASSIGNOR, BY MESNE ASSIGNMENTS, TO LEWIS B. JONES, OF SAME PLACE.

GAS COOKING AND WATER-HEATING RANGE.

SPECIFICATION forming part of Letters Patent No. 522,903, dated July 10, 1894.

Application filed March 23, 1893. Serial No. 467,265. (No model.)

*To all whom it may concern:*

Be it known that I, BENJAMIN S. KOLL, of the city of St. Louis, in the State of Missouri, have invented a certain new and useful Improvement in Gas Cooking and Water-Heating Ranges, of which the following is a full, clear, and exact description, reference being had to the accompanying drawings, forming part of this specification.

This invention relates to a gas range, for cooking meats, vegetables and other articles of gastronomic use, and heating water, consisting of numerous sectional, yet incorporate devices for baking, boiling, broiling, frying, roasting, toasting, &c., besides the provision of a constant supply of hot water, into which are brought into multiple operation both an indivisible combination and improvements on my "gas combustion water jacket heater," filed February 4, 1893, Serial No. 460,734, and of the meat broiler gas stove, filed February 23, 1893, Serial No. 463,357, with other coadjutant devices, all operated by the one heating and mutually co-operative system; and the invention consists in features of novelty hereinafter fully described and pointed out in the claims.

Figure I is a vertical, side section, taken on line I—I, Fig. III, and shows an interior side elevation of the range with the valvular gas supply stand pipe, the aerated oven, with its roller shelf, and its perforate circlet burner, the broiler chamber with its pendent rack, its drip pan, and its duplex facing series of jet burners, and the water heater with its multiple jet cone, and corrugate stepped conical water jacket. Fig. II is a vertical end section, taken on line II—II, Fig. III, and shows an end elevation of the broiling chamber, and the conical water jacket. Fig. III is a top view of the range, and shows the conical hot water jacket with its burner and the three elevated burners of said range. Fig. IV is a horizontal section, taken on line IV—IV, Fig. I, and shows the conical heater and the conical stepped hot water jacket, one of the elevated burners, the aerating gas flues that supply the broiler chamber with part of one side of the top of the range and of the oven broken away to show the traveler shelf of the oven, and the perforate ventilated ceiling thereof. Fig. V is a front elevation of the range, and shows the oven door, the perforate door of the aerating basement chamber, the mica panel door of the broiler chamber, the perforate door of the aerating basement chamber beneath said broiler, the disks that operate the individual burners of the stand-pipe, and the elastic tube lighter torch for lighting the jets. Fig. VI is a vertical section, taken on line VI—VI, Fig. III, and shows the gas standpipe that supplies the various burners. Fig. VII is a vertical section, taken on line VII—VII, Fig. III, and shows the aerated basement, the aerated oven with its roller traveling shelf and its means of ventilation and free escape of its noxious odors to the chimney flue, with part broken away to show the aerated gas flue supply to one of the twin burners. Fig. VIII is an enlarged top view of one of the aerated gas burners. Fig. IX is an enlarged, vertical section, taken on line IX—IX, Fig. VIII, and shows one of the perforate cone burners. Fig. X is an enlarged top view of the twin burners that heat the oven, with one burner cap removed to show the perforate gas jets. Fig. XI is an enlarged, detail horizontal section, and shows one of the angle tube sections and one of the front rollers on which the oven shelf travels. Fig. XII is an enlarged, detail, vertical section, taken on line XII—XII, Fig. XIII, and shows one of the front rollers, and a transverse view of the traveler shelf of the oven mounted thereon. Fig. XIII is an enlarged, detail, vertical section, and shows one of the front rollers, and a longitudinal view of the traveler shelf. Fig. XIV is an enlarged, detail, horizontal section, and shows the traveler shelf of the oven, with part broken away, and one of the rear roller wheels, mounted within its journal bearer lugs. Fig. XV is an enlarged, detail, vertical section, and shows the rear pendent end of the traveler shelf, and one of the rear roller wheels on which said rear end is mounted. Fig. XVI is an enlarged, detail, vertical section taken on line XVI—XVI, Fig. XV, and shows one of the rear wheels on its journal bearings, and the traveler oven shelf mounted thereon. Fig. XVII is an enlarged side view of the junction flue cap; and Fig. XVIII is an enlarged vertical section, taken on line XVIII—XVIII, Fig. XVII.

Referring to the drawings:—1 represents the base platform of the multiple combination range 2, and 3 is the projecting flange around said base platform, to which it is secured by the rivets 4. 5 represents the front-plate, 6 the side-plates, 7 the back-plate, 8 the top-plate of said range, and 9 are the vertical angle brackets that connect said front, side and back plates by means of the rivets 10, that are fastened therein. 11 represents the aerated, major combustion chamber, which is inclosed within the parellelopiped sheet metal partition 12, that is secured by rivets 13 to the perforate lugs 14, that project inwardly from said front plate 5, thus confining the heat within said aerated combustion chamber, and providing a non-conductor dead air chamber 15, all around said combustion chamber 11 outside said partition wall 12, except in front, which is alone inclosed by the front plate and its doors. 16 represents the oven, which oven is inclosed within the sheet metal partition walls 17, which partition is held within the upper portion of said combustion chamber, by its attachment to the perforate lugs 18 that integrally project inward from the front plate 5, the said attachment being secured by the rivets 19, in a position that allows a free passage 20 of the hot products of combustion around the sides and back and over the top of said inclosing partition. Through the perforations 21 of said top plate, the said hot products pass downward through the oven and around the articles therein in the course of baking.

The dense odors that escape from the provisions in the course of baking pass out through the perforate vents 22, into the square corner channel tubes 23 on each side of the oven, the said tubes being formed by the inclosure of the two side corners in the interior of the oven by the sheet angle iron sections 24, the integral, perforate lugs 25 of which are secured to the coincidently perforate bottom plate of the oven by the rivets 26.

27 represents duplex angle flues that ascend from the discharge ends of the square channel flues 23, until they mutually discharge into the elbow turn escape flue 28, the top of which discharges into any usual chimney flue, not shown. The said flue 28 is secured by its connection with its joint flue 136, to the back of the oven by the rivet or rivets 29.

30 represents the traveler oven shelf, the rear corners of which are surmounted by the perforate journal bearer lugs 31, in which run the journals 32 of the rear roller wheels 33, which rear roller wheels run on the track ways formed by the upper surface of the angle iron inclosures 24 of the square corner channel tubes 23. The front roller-wheels 74 are mounted on the journals 75 that have bearings 76 in the mounting lugs 77, that hang pendent from the lower surmounting side of the square inclosure angle-plates 24. The front portions of the sides of the traveler oven shelf 30, ride on the upper side of said roller-wheels 74, and are retained from lateral divergence from their true course by the peripherally projecting rims 78 on the outer sides of said wheel. An opening 79 in the surmounting side of the angle plates 24, above said front roller-wheels, gives place for the surmounting protrusion of their upper operative sides to enable them to carry said traveler shelves.

34 represents perforate angle holder plates which are secured by rivets 35, through coincident perforations in the sides of the oven inclosure, to said sides. The projecting flanges 36 of said angle holder plates, constitute surmounting tracks for the rear roller wheels 33, to hold them down to their bed-tracks on the angle iron sections 24. When the loaded traveler-shelf is run out by the cook to attend to the dishes in the course of cooking thereon, the said rear wheels being thus held down to their track, the shelf, that said wheels command, is thus held from tilting.

37 represents the stand-pipe, that rests on its base 62, on the bed platform 63, and both carries and distributes the gas that it receives from the general supply pipe 38, which gas is as required distributed and shut off, by the separate valves, indicating them in rotation from the base of said stand-pipe upward, as follows:—39 commands the broiler supply burners, 40 the oven supply burners, 41 the hot water jacket supply burner, 42 and 43 respectively, the two rear surmounting burners and 44 the front surmounting burner, the last three burners operating through the top plate for boiling and frying purposes, &c. The respective rods 45, 46, 47, 48, 49 and 50, and hand disks 51, 52, 53, 54, 55 and 56, operate said valves, to turn on, regulate the supply and shut off the gas. The projecting ends of said operating rods pass through the front-plate 5, within the counter-sunk panel recess boxing-plate 57, within which counter-sunk panel said hand disks are operated, and thus said disks do not project beyond the face line of the front of the stove, and therefore are out of the way of interference or catching against passing objects. The said recess boxing plate 57 is seated within a coincident aperture 58 in said front plate, and its perforate peripheral flange 59, rests in the perforate, recessed flange 60, around said opening in the front plate where it is secured by the rivets or screw rutted bolts 61. When in this preferred form the said recessed boxing 57 is not integral with said front plate 5, it can readily be detached and removed if the valves of the stand-pipe should need any attention or repairs.

64 represents the gas supply pipe from the valve 46 to its discharge into the gas aerating tube 65, into the flaring mouth 66 of which air freely enters to oxygenate or aerate the gas as it passes through said tube to the cross branch tube 67, from which it passes to the duplex oval perforate twin burners 68, from which said gas passes in jets through the perforations 69 in the caps 70, that surmount said burners. 71 represents an angle bracket the foot of which is riveted to the partition plate 12, and its head 72 is secured by the rivets 73 to said gas aerating tubes 65 and 67.

80 represents the broiler chamber of my combination range, which is of somewhat similar construction to my broiler devices for which I have made application of approximately even date with this, and to the drawings and specification of which application I draw attention; as also to my hot water jacket heater for which I filed application, February 4, 1893, Serial No. 460,734; which hot water jacket heater also enters into this combination range. Reference is made to said two previous applications on said stoves, so as to elucidate the subject, without too minute descriptions in the present combination (not stove but range) case. The said range while having individual likenesses in some of its combined elements, that aid each other by being ranged together in said combination range, instead of a more simple stove arrangement, also aid the cook or operator in the above specified combination form. It will also be seen that some of the individual elements that enter into the present arrangement of the broiler and hot water jacket, have been specifically and even largely changed to bring them into coadjutary line with their combination arrangement as a range.

81 represents the top plate of the broiler inclosure, and 82 is a pendent ceiling plate, the upset angle-flanges 83 of which are secured to said top-plate by the rivets 84. The hot air exhaust from said broiler chamber ascends through the perforations 85 in said ceiling plate into the exhaust chamber 86 from which it escapes *via* the exhaust tube 87 into the usual chimney flue.

88 represents pendent, angle flanges along the middle of the ceiling plate, and 89 are upturned tracks at the terminals of said flanges on each side of a long slotway 90.

91 represents the pendent neck of the broiler-rack 92, which is surmounted by the head 93. Said neck passes through said slotway 90 and said head travels on said upturned tracks 89. The top back shoulder bar 94 extends transversely from said pendent neck, and the open wove wire or rod back 95 of said broiler rack hangs pendent from said shoulder bar, and its inwardly curved lower extremity 96 embraces its foot-rod 97. 98 represents an open wove rack-gate, the inwardly curved lower extremity 99 of which embraces its foot-rod 100. Said two foot-rods 97 and 100 are hinged together by the links 101. The top bar 102 of said rack-gate is held in position when closed by the pendent latch 103, that is hinged at 104 to the aforesaid top bar at the back of the rack, and the projecting trigger lever 105 of said latch is tripped up by said gate when it is elevated, which enables said latch to surmount and lock the gate in its closed position.

106 represents the back reflector and partition plate and 107 the side reflector and partition plates of said broiling chamber 80, which are respectively riveted to the angle flanged rear and sides of the pendent ceiling-plate 82. Said reflector plates may be of tin or bright, galvanized sheet iron, or of any other suitable material. The said side reflector plates are secured at their lower sides by rivets 108 to the upper flanges 109 of the duplex multiple jet burner box frames 110, on each side of the broiling chamber, and angle foot plates 111 are secured by rivets 112 to the lower flange edges 113 of said box burner frames. 114 represents the sliding drip pan, the surmounting side rim flanges 115 of which are seated and slide on the depressed flanges 116 of said angle foot plates 111, and the back rim flange 117 of said drip pan rests on the foot flange 118 of the back reflector partition plate 106, when said drip pan is inserted in its operative position.

119 represents the gas supply pipe from the broiler valve 39, which supply pipe discharges into the aerating tubes 120, into the open mouth 121 of which the air has free entrance to aerate the gas with atmospheric oxygen. The said aerating tube 120 supplies the oxygenated gas *via* the elbow pipes 122, and discharge pipes 123, to the gas burner chambers 124 within the aforesaid duplex multiple jet burner box frames 110, on each side of the broiler chamber. 125 are the multiple projecting jet burners that project from said duplex box burner frames. I have shown said burner frame boxes in their preferred vertical position, but do not confine myself to that position, as they may be inclined in either an overhung or underhung position.

126 represents my stepped and corrugated water jacket tank, the inner and outer walls of which are built in a cone shape and with said steps 127 and corrugations 128 to the better arrest and utilize the products of combustion, and 129 are angle brackets that are secured by rivets 130 to said water jacket tank and the attachment flanges 131 of which are secured by rivets 132 to the front plate 5 of the range. 133 represents the water supply pipe that delivers adjacent to the base of said jacket tank, and 134 is the hot water discharge pipe, that takes the hot water from near the top of said tank, and carries it *via* the jointed hot water pipe 135 to any convenient hot water supply deposit.

136 represents a duplex coupling flue joint, the twin tubular arms of which are of conical formation so as to enable its twin base collars 137 to fit on or in the surmounting collar tops 138 of the aforesaid converging duplex angle-flues 27, and the flange collar 139 that projects rearward from said coupling flue and fits within the elbow base of the aforesaid escape flue 28 that discharges into the usual chimney flue. A perforate attachment collar 140 on said coupling flue joint is secured by the aforesaid rivets 29 to the back plate of the oven. 166 is an angle collar that fits around said coupling flue joint 136, and its attachment flange is secured by rivets 167 to the partition plate 12. 168 represents a key-pin that passes through and is seated in the coincident key holes 169, in said collar 166 and in the coupling joint flue 136, and as said coupling joint flue is fast riveted to the back of the oven, said key-pin securely locks said oven and duplex flues in their bed-seat in the range. It will thus be seen that when at any time it is desired to remove said oven and flues for cleaning or other purposes, all that is required to release the same is to remove said key-pin. In said coupling flue-joint in my preferred form shown in Fig. XVII, its collar flange 139 projects beyond the partition plate 12 into the dead air chamber 15, for the convenience of its key-pin connection to the collar 166.

141 represents the gas supply pipe from the valve 41 of the stand pipe. The said gas pipe discharges into the aerating tube chamber 142, the flaring mouth 143 of which receives a generous supply of air for oxygenating the gas and a thorough mixture of the same is thus effected in said chamber, on its passage to the cone burner 144, that heats said water jacket tank 126. The freshly aerated gas passes through multiple perforations 145 in said cone burner and burns in jets 146. The hot products of combustion from said burning jets forcibly drive against the corrugated overhanging and projecting stepped sides of said water jacket, and said corrugation and steps and said overhanging sides of said jacket all enforce the arrest of said hot products of combustion, and rapidly heat the water as it passes upward and around through the tank.

147 represents the oven door which is hung by the hinges 148, and fastened by the catch 149 to the front plate of the oven and is operated by the handle 150.

151 represents the door of the aerated main combustion chamber 11, which door is hung by the hinges 152 and fastened by the catch 153 to the front plate and is operated by the handle 154, and the lower portion of said door is provided with numerous aerating perforations 155.

156 represents the door of the broiler chamber 80, which door is hung by the hinges 157 and fastened by the catch 158 to the front plate; and is operated by the handle 159; and said door is provided with mica panels 160 to aid the inspection of the cooking material in the course of broiling.

161 represents a basement door beneath that of the broiling chamber which door is hung by the hinges 162 and fastened by the catch 163 to the front plate, is operated by the handle 164, and is provided with aerating perforations 165 in the lower portion of its panel.

170, 171 and 172 represent the respective rear and front perforate cone gas burners, that operate through the respective burner openings 173, 174 and 175 in the top plate of the range, for boiling, frying and other like purposes, and 176, 177 and 178 are the spider gratings of their respective burners, and 179, 180 and 181 are the respective cap plates of said burners. 182, 183 and 184 are inverted cone flues that are held in position to their bed frame by the angle collars 216 and rivets 217 for guiding the hot products of combustion from said burners to the cooking utensils that surmount them.

185, 186 and 187 represent the gas supply pipes that conduct the gas from the stand-pipe 37 via the aforesaid respective valves 42, 43 and 44, to the respective aerating tubes 188, 189 and 190 and when aerated therein the aerated gas passes to the three last named burners 170, 171 and 172. The open mouths 191, 192 and 193 of said aerating tubes admit air freely for the oxidation of said gas, on its way to said burners. 194, 195 and 196, are pendent, perforate ended brackets, that are secured by rivets 197, 198 and 199, to the top plate of the range, at their top ends and to said respective aerating tubes, at their lower ends, to sustain the latter.

200 represents the major crumb shelf with its handle 201, which shelf passes through the opening 202 in the front plate and slides on the ceiling portion of the partition plate 12, that separates the aerating chamber from the dead air chamber 15, and said crumb shelf works beneath the top surface burners on one side of the top plate, and catches all the crumbs or other material that drop through the burner openings from above, so as to prevent the interference of said material and the smoke incident to its consumption in the range.

203 represents the minor crumb shelf, having the handle 204, which crumb shelf passes through the opening 205, in the front plate, and said crumb shelf slides on the ceiling plate 82 above the broiler chamber 80, and beneath the burner of the hot water jacket and the rear top burner on the same side; for a like purpose with that of the major crumb shelf. These shelves 200 and 203 when they are drawn out or partially so, are also useful for the deposit of articles connected with the culinary operations about the range, that it is not desired to place on said range itself.

206 represents a gas supply tube that connects with near the top of the stand pipe 37 and extends to and through the opening 207 in the front plate of the range.

208 represents an elastic gas tube, which is securely tight mounted on the projecting end of the gas tube 206, outside the front plate; the said elastic tube being held to its seat around the projecting end of said pipe by means of the wire binding 209, or by other suitable means.

210 represents a spring valve gas tube torch, that is of usual construction of said torches. The said torch is connected to the loose end of said elastic gas tube, and when not in use the hanger loop 211 that projects longitudinally from the handle end of said torch, may be suspended on the hook 212 that projects from the front plate, to hang up the torch until it is further needed. Normally the valve 213 in said torch is almost closed by the control of the spring 214, so that only a very minute jet of ignited gas is projected from said torch.

When it is desired to ignite the gas at any of the individual burners in the range, the valve or valves (as the case may be) that regulate the gas supply to said required burner or burners are opened by the turn of the hand disk or disks that command the same. The operator having previously taken the gas torch 210 in his hand, then presses the button 215 in said torch which throws back the spring with which it connects, and the valve of the torch opens wide and the already ignited jet shoots out, enabling the operator to light therewith any of the gas jets he requires. The pressure of his hand is then withdrawn from the button and the valve in the torch is again nearly closed by the spring, and the jet again subsides into its limited normal condition, and the torch can be again hung up until wanted for further service.

The operation of the various parts of the device have been pretty fully described at the several introductions of said parts.

It will be seen that the several parts combine together as coadjutary and co-active parts of a complete whole in a multiple culinary device, in which the several parts are furnished with their gas supply from the same fountain head, the stand-pipe 37 and all are brought into such convenient and novel combination as to work together coadjutively, in so small a comparative compass as to make a "*multum in parvo*" in a multiple culinary range. The deep panel recess boxing key plate 57 also has a combination of advantages. By its countersink form the keys or hand disks that operate the gas supply valves in the stand-pipe 37, are entirely retired back of the surface level of the front plate of the range, so as not to come in contact with the operator's clothes or with passing objects. Great inconvenience and even danger from escaping gas has been experienced, where as is usual said valve-keys or hand disks project beyond the surface plates of the range, by their accidental unobserved turning from said frictional contact with passing objects, besides the inconvenience when on the other hand the valves are unintentionally closed, and said countersink key plate being removable opens up access to the valves, &c., for purpose of cleansing and repairs. Also the square channel corner tubes 23 with their perforate vents 22, have a double function for carrying off the hot aerating exhaust of the aerated oven, on an imperforate smooth floor having no recessed flue breaks in said floor that are objectionable as dust and dirt deposits and at the same time said raised corner flues constitute wheel tracks for the mounted traveler shelf of my range.

I claim as my invention—

1. The combination of the vertical gas supply stand-pipe, 37, vertically arranged series of distributing valves 39—44, valve rods 45—50, vertical series of operating handles 51—56, the recessed plate 57 within which said handles are retired, the supply pipes at different altitudes controlled by the said valves and connecting the stand pipe with the various cooking appliances and the aerating chambers and burners to which the gas is supplied, all as herein described.

2. In a gas range, the combination of the stand-pipe 37, the adjustable valves in said stand-pipe, the supply pipes, aerating chambers and burners connected with said valves, the perforate countersunk key or disk plate 57, said plate being attachable and detachable, the operative valve rods, and the valve keys or hand disks that adjust said valves, said key-disks retired within the countersink of said plate 57; substantially as described.

3. In a gas range, the combination of the aerated oven 16, the twin burners 68, beneath said oven, the aerating gas tube chamber that supplies said twin burners, the aerated chamber 11, in which said oven and twin burners are located, the perforate, aerating door 151, said oven provided with a perforate ceiling and an imperforate base floor, the corner angle iron boxings 24 provided with the channel flues 23, said boxings having the perforate exhaust vents 22; substantially as described.

4. In a gas range, the combination of the aerated oven, said oven having the perforate ceiling and imperforate base floor, the combination boxings 24 provided with the corner perforate channel flues, and wheel tracks for the traveler shelf, and said traveler shelf 30 with its mounted wheels; substantially as described.

5. In a gas range, the combination of the aerated oven, said oven having the perforate ceiling and imperforate base floor, the combination boxings 24 that inclose the corner channel flues 23, said boxings provided with perforate vents 22, and the tops of said channel flues constituting a wheel track, the traveler oven shelf 30, the wheels on which said shelf is mounted, the aerating combustion chamber, the duplex flues 27, the duplex conical joint flue 136, the perforate angle collar 166, the exhaust escape flue 28, and the key-lock pin 168; substantially as described.

6. In a gas range, the combination of the aerated oven 16, the corner boxings 24, that inclose the channel flues 23, said boxings provided with the perforations 22, the front roller wheels 74 having journals 75, the bearer journal mounting lugs 77, in which said wheels are mounted, the peripherally projecting rims 78 of said roller wheels, the traveler oven shelf 30, on said roller mount, the front roller wheels 33 on the journals 32 and the projecting bearer lugs 31 that surmount said traveler shelf; substantially as described.

7. In a gas range, the combination of aerated oven 16, surrounded by an aerating combustion chamber, said oven having a perforate ceiling and an imperforate base floor, the corner boxings 24 that inclose the channel flues 23, said boxings provided with the perforate vents 22, the exhaust flue vents from said channel flues, the wheel mounted traveler shelf and the angle holder bracket plates 34, that prevent the tilting of the traveler shelf; substantially as described.

BENJAMIN S. KOLL.

In presence of—
BENJAMIN KNIGHT,
ALBERT M. EBERSOLE.